United States Patent Office 2,909,223
Patented Oct. 20, 1959

2,909,223

GYPSUM CEMENTS

Herman Henry Kaveler, Bartlesville, Okla., assignor to Phillips Petroleum Company, a corporation of Delaware No Drawing. Application May 5, 1952
Serial No. 286,132

17 Claims. (Cl. 166—31)

This invention relates to gypsum cements having retarded rates of hydration or set, to slurries of such cement, and to the method of making these slurries. In another aspect it relates to any gypsum cement composition in a dry form, or with added water in an aqueous slurry form, which when in the form of an aqueous slurry has a retarded initial set or extended or retarded thickening time and/or a reduced water-loss to adjacent porous formations, due to the addition of a minor but effective amount of acid carboxymethyl hydroxyethyl cellulose mixed ether and salts of acid carboxymethyl hydroxyethyl cellulose mixed ether, this invention relating first to said composition of matter, second to processes of compounding said compositions, and third to processes for using said compositions in the arts of cementing wells, sealing porous formations during the drilling of wells, cementing casings in the well, squeeze cementing, plugging the well or the earth formation adjacent the same, and grouting or sealing crevices, cracks or holes in man-made formations, such as buildings, foundations, dams, breakwaters or concrete and masonry structures, in some instances the cracks or fractures already existing before the slurry is pumped into them, and in some cases the pressure of the slurry being pumped into or against the surface of said formation or structure forming by its pressure the cracks or fractures to be filled. Wherever cement is mentioned in the present application it is gypsum cement that is referred to.

Among the objects of the invention is the provision of a cement having a retarded rate of hydration, or retarded set, as it will be hereinafter termed, particularly at elevated temperatures up to and above 150° F. and/or at high pressures up to and above 20,000 pounds per square inch, such as are encountered in cementing of deep wells.

One object of the present invention is to provide a suitable gypsum cement aqueous slurry, and suitable processes employing the same, for cementing casing in wells, for squeeze cementing in wells, and for grouting cracks, fractures or voids, in natural formations, such as in wells, or in man-made formations such as dams, breakwaters, walls and massive foundations and structures of all types.

Another object of this invention is to provide a dry gypsum cement powder which is a novel composition of matter, and which may be mixed with water to form an aqueous cement slurry which is a novel composition of matter and which has at least one of the following useful properties: a relatively retarded time of initial set, a relatively extended thickening time during which it is pumpable, and/or a relatively low water-loss to porous formations with which it may come in contact during cementing or grouting operations.

Further objects of the invention reside in the provision of a slurry of the above cement, and in a method of making such slurry.

These and further objects of the invention will be more readily apparent in the following description.

In the cementing of oil wells it is customary to mix a gypsum cement, for example, a material containing at least 66% calcined gypsum, which is calcium sulfate with an averge of a half molecule of water (having the average formula $CaSO_4 \cdot \frac{1}{2}H_2O$ calculated from the $SO_3$ content thereof), with the requisite amount of water to form a pumpable neat slurry, and to pump the mixture into the well and down the hole into the place where it is desired to have it harden. In present oil well drilling practice, with wells commonly ranging from 6,000 to 12,000 feet or more in depth, high temperatures are encountered at the locations which are to be cemented, and relatively long periods of time are often required to pump the slurry into place. Furthermore, in the customary practice of pumping the cement slurry down through the casing and either forcing it out the bottom of the casing and upward around the outer surface of the casing, or through perforations in the lower end of the casing into the formation sought to be sealed, the slurry is required to pass through narrow channels and small openings. Successful placement of the slurry, therefore, requires that the slurry shall remain fluid and pumpable at high temperatures for several hours before it begins to harden. However, after the slurry has been pumped into place, it is desirable to have the hydration or set proceed at a rate at which the slurry will attain its final set and develop considerable strength within a reasonable time, say within a few hours.

As pointed out in the preceding paragraph, the most important function of the gypsum cement aqueous slurry of the present invention is that it has a retarded time of initial set, and therefore remains pumpable for a relatively long period of time and a relatively long period of time passes before it thickens, and yet it will attain a final set of some considerable strength within a reasonable length of time so that the well-drilling crew is not unduly delayed, but can get back to work and proceed to continue drilling the well bore, or to perforate the casing and/or cement with the usual gun perforating tools known to the art. As additives, acid carboxymethyl hydroxyethyl cellulose mixed ether and salts of acid carboxymethyl hydroxyethyl mixed ether have sufficient set retarding and thickening time extending properties in gypsum cement to be used commercially in the practice of the present invention, and at the same time a secondary effect is achieved, which is of considerable value in cementing oil wells, namely, the aqueous cement slurry containing the minor but effective amount of one of said additives has a reduced tendency to lose water to porous formations across the surface of which it must pass in going to its intended position in the well. Many failures in prior art oil well cementing jobs, which have been accredited to the premature setting of the cement, are thought to be caused actually by the formation dehydrating the cement slurry, thereby rendering the cement immobile before it reaches the desired position. As the practice of using scrapers to clean the mud off the well walls to obtain a better cement-formation bond becomes more frequently used, the better the formations may absorb water from the cement slurry causing it not only to plug the annulus between the casing and the wall of the well, but also to have insufficient water for normal hydration upon setting, and the greater will become the realization of the need for low water loss cements.

Everything which is said applying to natural formations in wells applies also in some degree to man-made formations being grouted, and the word "formation" as used herein is regarded as generic to natural earth formations, geological formations, and man-made formations such as structures.

In the prior art of squeeze cementing in wells and in forcing grout into the cracks and crevices in fractured foundations or the like, it has been the practice to employ as a breakdown agent, water or drilling mud, which is forced ahead of the aqueous gypsum cement slurry into the formation to split the same and enlarge the fractures or cracks to be filled, because if ordinary gypsum cement aqueous slurry were employed it would lose water to the formation or foundation so rapidly that the cement slurry would start to set before much penetration has been effected. When a relatively low water-loss gypsum cement aqueous slurry is employed, the amount of breakdown agent can be greatly reduced, or entirely eliminated, because the low water-loss cement slurry will penetrate to much greater distances before losing sufficient water to be caused to set by this dehydration. When squeeze cementing in oil wells is involved, in which it is desired to force a thin disk or layer of these cement slurries out into a natural earth formation along pre-existing or pressure-made fractures, in order to separate an oil sand from some other sand at the general vicinity where the oil well intersects the same, it is especially advantageous to use a relatively low water-loss cement slurry as breakdown agent because then less water is likely to be absorbed by the oil formation where it might cause a reduction in the present or future amount of production of oil. Some oil-bearing formations contain bentonitic materials which swell when they encounter water, and if excess water is injected into such formations, the swelling of the bentonitic material may prevent future production of oil.

It is not believed necessary to have a drawing, or to describe minutely the well known cementing operations disclosed in such patents as U.S. 2,795,507 and 2,795,508.

By gypsum cements this invention includes all cementitious mixtures containing more than 66% of calcined gypsum as defined by the American Society for Testing Materials in their standards for gypsum cements of 1942, pages 94 to 131 inclusive, as amended in 1950. Calcined gypsum has an average formula of one molecule of calcium sulfate for each one-half molecule of water, as calculated from the $SO_3$ content, and is as follows:

$$CaSO_4 \cdot \tfrac{1}{2} H_2O$$

This includes all standard gypsum neat plaster, scratch or first coat plaster, brown or second coat plaster, gypsum molding plaster, gypsum pottery plaster, Keene's cement, gypsum dental plaster, calcined terra alba, calcined selenite, calcined alabaster, Hydrocal (trademark name for gypsum cement, or alpha gypsum, made according to U.S. patent to Wilbur S. Randel et al. 1,901,051 of March 14, 1933), alpha gypsum, Certrock (trademark name for calcined gypsum plus some 1 to 2% mixture of gum arabic and alkaline reacting materials such as lime, litharge, or soda ash), Hydrostone (trademark name for Hydrocal given the Certrock treatment), Hydromite (trademark name for calcined gypsum plus carbamide-formaldehyde resin), calcined gypsum autoclaved with minor amounts of neutralized organic acids such as malcic, cinnamic, adipic, o-phthalic succinic acid and other dicarboxylic salts (see Industrial Engineering Chemistry 41 (1949) No. 5, pp. 1061–1065), plaster of Paris, Cal-Seal (a trademark for treated plaster of Paris, see World Oil, August 1949, pp. 119–126) including Cal-Seal 60 and Cal-Seal HT, and all other like gypsum cements.

When gypsum cements set the reaction is as follows:

$$CaSO_4 \cdot \tfrac{1}{2} H_2O + 1 \tfrac{1}{2} H_2O \rightarrow CaSO_4 \cdot 2H_2O$$

The rate at which this occurs, and the strength of the set cement, depends on the size and shape of the calcined gypsum crystals, and the properties of the minor additives present.

In most oil well cementing and grouting operations it is generally desirable to use neat cement for added strength, but obviously it is always possible to add to the gypsum cement, water, and acid carboxymethyl hydroxyethyl cellulose mixed ether and salts of acid carboxymethyl hydroxyethyl cellulose mixed ether, any desired amount of an inert granular filling material or aggregate such as sand, ground limestone, or any of the other well known inert or even cementitious aggregates, as long as simple tests show the amount added does not reduce the compressive strength after final set below the desired value. For example, in plugging porous formations, bentonite or other clays are often added to gypsum cement aqueous slurries, as taught by U.S. Patent 2,401,086 of May 19, 1936, or iron oxide or barium sulfate is added to make heavy cement. Any of these aggregates can be added to the aqueous gypsum cement slurry of the present invention in the usual proportions used in the prior art.

In operations in previously uncased wells it is often desirable to use neat cement in the practice of the present invention, because inert filling material may automatically become detached from the walls of the well, and will tend to mix with the slurry and dilute it to such an extent that it is undesirable to add any filling material to the slurry being forced into the well. It is customary in the prior art when cementing to make simple tests as to time of set, compressive strength, etc., on samples of the proposed mix.

The amount of water added to the cement of the present invention is not critical, it being obvious that sufficient water should be added to form a pumpable slurry, and that when the slurry becomes pumpable no further water need be added. One advantage of the slurry of the present invention is that it is a low water-loss slurry, and therefore it is not necessary to add much excess water over the amount making the slurry pumpable as a reserve for expected losses, which excess water might tend to reduce the final compressive strength of the cement.

It has been found that all gypsum cement aqueous slurries can be retarded in setting time, the time of thickening extended, and the water-loss tendencies reduced so that they meet all the above requirements for the satisfactory cementing of deep wells and like operations by the addition of a minor but effective amount of from about 0.05 to 5% by weight of the dry hydraulic cement of acid carboxymethyl hydroxyethyl cellulose mixed ether, or the metal, ammonium, organic base, or other salts of said acid cellulose derivative, without seriously affecting the other desirable properties of the gypsum cement. It is preferred at present to use the sodium or potassium salts of said acid cellulose derivative merely because these salts are readily available commercially and therefore relatively inexpensive. However, good results should be obtained using any other alkali metal salts, such as the lithium, rubidium, caesium and other rare alkali metal salts, or the ammonium or organic base salts, such as the pyridine, triethanolamine, morpholine salts of said acid cellulose derivative, all of which are water soluble or hydrolize in the gypsum cement slurry. In addition the alkaline earth metal salts such as the barium, calcium, strontium and magnesium, and the heavy metal salts such as the aluminum, iron, copper, lead, silver, mercury, nickel, and all other salts of this acid cellulose derivative (which are probably insoluble in water but which hydrolyze in the gypsum cement aqueous slurry) are just as useful in this invention in the aqueous gypsum cement slurry. This acid cellulose derivative and all of its salts, whether such salt is formed in the aqueous gypsum cement slurry by hydrolysis of some water-insoluble salt, are all valuable in amounts of 5 percent or less, based on weight of dry cement, in retarding the set of aqueous gypsum cement slurry, especially at the temperature and pressure encountered in cementing a well, and will decrease the water loss from said aqueous gypsum cement slurry to porous formations encountered in the well.

While 0.05 to 5% of said acid cellulose derivative or its salts by weight of the dry gypsum cement will give valuable results, it has been found that from 0.2 to 1% is the most preferred range in wells less than 14,000 feet deep and less than 150° F., the use of 0.5% being particularly effective in such wells, and the percentages above 1% being chiefly of value in still deeper and/or hotter wells.

As acid carboxymethyl hydroxyethyl cellulose mixed ether and its salts are common articles of commerce, which may be purchased from the Hercules Powder Company or others, no description of them is regarded as necessary. Methods of preparation will be found in many printed publications earlier than the filing date of the present application known to those skilled in the art.

In order to form a perfect seal in cementing wells, it is necessary that the cement be placed before the initial set occurs and it is desirable that it be placed and allowed to stand for a short period before the initial set begins. With the equipment available, there is a limit to the time in which it is possible to mix a cement and pump it into the bottom of the well and up around the casing to the location desired.

Another reason it is necessary to have the cement in place before the initial set begins is that the viscosity rises as the setting progresses. This increases the difficulty of pumping and is undesirable because of the added strain on the pumping equipment.

The most convenient method of using said acid cellulose derivative or its salts in cement is to run the same and the gypsum cement through a rotary mixer to produce intimate mixing and later add water to form a fluid slurry. However, said acid cellulose derivative or its salts may be added directly to the cement and water at the time of mixing at the well, or may be dissolved in the water with which the cement is mixed, with substantially the same result. The method of mixing is not critical as long as a somewhat uniform mixture is produced.

While it is not desired to limit the present invention by any theory of operation and while the scope and validity of the claims do not depend upon the validity of any theory of operation, it is believed helpful in understanding the invention to think of said acid cellulose derivative or its salts as temporarily absorbing so much of the water that the gypsum cement is only slowly able to obtain enough water to make its initial set, whereby the initial set of the cement is greatly retarded. Finally the gypsum cement particles take the water away from the water soluble cellulose particles and attain an initial and then a final set with suitable strength in the cement for use in oil well cementing operations.

EXAMPLE

In all these experiments the additive was first dissolved in the makeup water. Then the cement was added and mixture stirred two minutes with a malted milk mixer. The initial water loss test was made before 3 minutes had elapsed, but even then the plaster of Paris of Test No. 1 had set to the extent that it had no water-loss and was unpumpable, having passed the Haliburton thickening time pumpability limit of 100 poises viscosity.

In Table No. I the type cement listed is mixed with 40% or 50% by weight of water, as listed, which water contained enough additive to give about 0 or 0.5% by weight of the dry cement of the additive in the mixture, the thickening time to reach 100 poises viscosity was noted at the temperatures of 80, 100, 150 or 180° F., as listed, and the water loss in milliliters in the number of minutes noted at which water flow from the sample substantially ceased was noted at 75° F. on separate samples at 3 minutes and one hour, respectively, after mixing. In Table I the abbreviation NaCMHEC stands for sodium carboxymethyl hydroxyethyl cellulose mixed ether. Cal-Seal 60 and Cal-Seal HT are trade-marks of the best treated plaster of Paris available in the prior art.

*Table I*
REDUCED WATER LOSS, RETARDED SET GYPSUM CEMENTS

| Test No. | Type Cement | Percent $H_2O$ | Additive | Percent Additive | Thickening Time (Hrs.) | (At Temp.), °F. | Water Loss (Ml./Min. @ 75° F.) 3 min. | 1 hr. |
|---|---|---|---|---|---|---|---|---|
| 1 | Plaster Paris | 50 | None | 0 | 0.05 | 80 | set | set. |
| 3 | do | 50 | NaCMHEC | 0.5 | 2.9 | 80 | 24/18 | 23/14. |
| 5 | do | 50 | NaCMHEC | 0.5 | 2.6 | 80 | | |
| 6 | Cal-Seal 60 | 50 | None | 0 | 1.1 | 80 | | |
| 7 | do | 50 | do | 0 | 1.0 | 100 | | |
| 8 | do | 40 | do | 0 | 1.3 | 150 | 31/0.6 | Almost Set. |
| 9 | Cal-Seal HT | 40 | do | 0 | 0.8 | 150 | | |
| 10 | do | 40 | do | 0 | 1.0 | 180 | | |
| 11 | do | 50 | do | 0 | | | 39/0.4 | Almost Do. |

The water losses of the cement slurries were determined by the procedure specified for use on drilling fluids by API code 29 (1942).

Thickening times of cement slurries were measured at atmospheric pressure in a Halliburton consistometer according to the procedure described in API code 32, section XII, paragraphs 54 and 67 (1947).

While numerous examples of the invention have been given for purposes of illustration, the invention is not limited thereto.

Having described my invention, I claim:

1. A cement capable of forming a fluid slurry when mixed with water, said cement having a decreased water loss, said cement consisting essentially of a gypsum cement containing more than 66% calcined gypsum by weight mixed with a minor proportion of a gypsum cement water loss reducing agent selected from the group consisting of acid carboxymethyl hydroxyethyl cellulose mixed ether and salts of acid carboxymethyl hydroxyethyl cellulose mixed ether.

2. A cement capable of forming a fluid slurry when mixed with water, said cement having a decreased water loss, said cement consisting essentially of a gypsum cement containing more than 66% calcined gypsum by weight mixed with 0.05% to 5% by weight of the dry cement of a gypsum cement water loss reducing agent selected from the group consisting of acid carboxymethyl hydroxyethyl cellulose mixed ether and salts of acid carboxymethyl hydroxyethyl cellulose mixed ether.

3. A gypsum cement slurry having a decreased water loss at temperatures above atmospheric, consisting essentially of a gypsum cement containing more than 66% calcined gypsum by weight, water and a minor proportion of a gypsum cement water loss reducing agent selected from the group consisting of acid carboxymethyl hydroxyethyl cellulose mixed ether and salts of acid carboxymethyl hydroxyethyl cellulose mixed ether.

4. In the method of cementing a casing in a well which comprises pumping down through the casing and into the annular space between the casing and the borehole an aqueous gypsum cement slurry, containing more than 66% calcined gypsum by weight of the dry cement, the step of adding to the cement slurry a gypsum cement water loss reducing agent selected from the group consisting of acid carboxymethyl hydroxyethyl cellulose mixed ether and salts of acid carboxymethyl hydroxyethyl cellulose mixed ether.

5. The process of producing a gypsum cement aqueous slurry having an extended time of set which comprises admixing with gypsum cement containing more than 66% calcined gypsum by weight from 0.05% to 5% by weight of the dry cement of a gypsum cement water loss reducing agent selected from the group consisting of acid carboxymethyl hydroxyethyl cellulose mixed ether and salts of acid carboxymethyl hydroxyethyl cellulose mixed ether, and mixing therewith sufficient water to produce a fluid slurry.

6. The process of cementing a well which extends into a porous formation which comprises placing a gypsum cement aqueous slurry containing more than 66% calcined gypsum by weight of the dry cement having a reduced water-loss adjacent to said porous formation by admixing with gypsum cement a minor proportion effective to reduce the water-loss of said slurry of a gypsum cement water loss reducing agent selected from the group consisting of acid carboxymethyl hydroxyethyl cellulose mixed ether and salts of acid carboxymethyl hydroxyethyl cellulose mixed ether, mixing therewith sufficient water to produce a fluid slurry and introducing said slurry into said well into contact with said porous formation.

7. A cement capable of forming a fluid slurry when mixed with water, said cement having a decreased water loss, said cement consisting essentially of a gypsum cement containing more than 66% calcined gypsum by weight mixed with 0.2% to 1% by weight of the dry cement of alkali metal carboxymethyl hydroxyethyl cellulose mixed ether.

8. A gypsum cement slurry having a decreased water loss at temperatures above atmospheric, consisting essentially of gypsum cement containing more than 66% calcined gypsum by weight, water, and a minor proportion of alkali metal carboxymethyl hydroxyethyl cellulose mixed ether.

9. A cement capable of forming a fluid slurry when mixed with water, said cement consisting essentially of gypsum cement containing more than 66% calcined gypsum by weight mixed with a minor proportion of sodium carboxymethyl hydroxyethyl cellulose mixed ether.

10. A cement capable of forming a fluid slurry when mixed with water, said cement consisting essentially of gypsum cement containing more than 66% calcined gypsum by weight mixed with a minor proportion of alkali metal carboxymethyl hydroxyethyl cellulose mixed ether.

11. A gypsum cement slurry consisting essentially of a gypsum cement containing more than 66% calcined gypsum by weight, water, and a minor proportion of alkali metal carboxymethyl hydroxyethyl cellulose mixed ether.

12. A gypsum cement slurry consisting essentially of gypsum cement containing more than 66% calcined gypsum by weight, water and a minor proportion of sodium carboxymethyl hydroxyethyl cellulose mixed ether.

13. In the method of cementing a casing in a well which comprises pumping down through the casing and into the annular space between the casing and the borehole an aqueous gypsum cement slurry containing more than 66% calcined gypsum by weight of the dry cement, the step of adding to the cement slurry alkali metal carboxymethyl hydroxyethyl cellulose mixed ether in amounts ranging between 0.2% and 1% by weight of the dry cement in the slurry.

14. In the method of cementing a casing in a well which comprises pumping down through the casing and into the annular space between the casing and bore hole an aqueous gypsum cement slurry containing more than 66% calcined gypsum by weight of the dry cement, the step of adding to the cement slurry a minor but effective amount of alkali metal carboxymethyl hydroxyethyl cellulose mixed ether sufficient to reduce the water loss properties of said slurry.

15. In the method of cementing a casing in a well which comprises pumping down through the casing and into the annular space between the casing and the borehole an aqueous gypsum cement slurry containing more than 66% calcined gypsum by weight of the dry cement, the step of adding to the cement slurry a minor but effective amount of sodium carboxymethyl hydroxyethyl cellulose mixed ether sufficient to reduce the water loss properites of said slurry.

16. The process of producing a gypsum cement aqueous slurry having an extended thickening time which comprises admixing with gypsum cement containing more than 66% calcined gypsum by weight a minor proportion effective to reduce said water loss of said slurry of alkali metal carboxymethyl hydroxyethyl cellulose mixed ether and mixing therewith sufficient water to produce a fluid slurry.

17. The process of cementing a hole which extends into a formation which comprises placing a gypsum cement aqueous slurry having a reduced water loss adjacent to said formation by admixing with gypsum cement containing more than 66% calcined gypsum by weight from 0.05% to 5% by weight of the dry cement of alkali metal carboxymethyl hydroxyethyl cellulose mixed ether, mixing therewith sufficient water to produce a fluid slurry and introducing said slurry into said hole into contact with said formation.

References Cited in the file of this patent

UNITED STATES PATENTS

| | | |
|---|---|---|
| 1,463,123 | McAllister | July 24, 1923 |
| 2,216,207 | Menaul | Oct. 1, 1940 |
| 2,278,455 | Linzell et al. | Apr. 7, 1942 |
| 2,425,891 | McMullen | Aug. 19, 1947 |
| 2,427,683 | Ludwig | Sept. 23, 1947 |
| 2,471,632 | Ludwig | May 31, 1949 |
| 2,514,021 | Abraham | July 4, 1950 |
| 2,580,565 | Ludwig | Jan. 1, 1952 |
| 2,583,657 | Lea | Jan. 29, 1952 |
| 2,618,595 | Gloor | Nov. 18, 1952 |
| 2,629,667 | Kaveler | Feb. 24, 1953 |
| 2,635,972 | Azorlosa | Apr. 21, 1953 |
| 2,673,810 | Ludwig | Mar. 30, 1954 |